United States Patent [19]

Kaneda et al.

[11] Patent Number: 5,036,421
[45] Date of Patent: Jul. 30, 1991

[54] DISC CARTRIDGE HAVING AN IMPROVED SHUTTER CONFIGURATION

[75] Inventors: Hiroshi Kaneda, Saku; Masaru Ikebe, Komoro, both of Japan

[73] Assignee: TDK Corporation, Tokyo, Japan

[21] Appl. No.: 359,111

[22] Filed: May 31, 1989

[51] Int. Cl.⁵ ............................................. G11B 23/03
[52] U.S. Cl. ...................... 360/133; 369/291; 206/444
[58] Field of Search .................. 360/133; 206/444; 369/291

[56] References Cited

U.S. PATENT DOCUMENTS

| | | | |
|---|---|---|---|
| 4,688,206 | 8/1987 | Nakagawa et al. | 360/133 |
| 4,698,714 | 10/1987 | Sugawara et al. | 360/133 |
| 4,714,973 | 12/1987 | Kato et al. | 360/133 |
| 4,797,770 | 1/1989 | Takahasi | 360/133 |
| 4,851,948 | 7/1989 | Kato et al. | 360/133 |

FOREIGN PATENT DOCUMENTS 0063978 4/1986 Japan .................. 360/133

Primary Examiner—John H. Wolff
Assistant Examiner—Craig A. Renner
Attorney, Agent, or Firm—Joseph W. Price

[57] ABSTRACT

A disc cartridge capable of permitting upper and lower shutter plates of a shutter to be substantially uniformly contacted with upper and lower surface portions of a slide area section defined on a casing to ensure satisfactory operation of the disc cartridge with high reliability. In the disc cartridge, the upper and lower surface portions of the slide area section are obliquely formed in such a manner that a distance between the upper surface portion and the lower surface portion is reduced toward a distal opening of the shutter fitted on the slide area section.

10 Claims, 1 Drawing Sheet

DISC CARTRIDGE HAVING AN IMPROVED SHUTTER CONFIGURATION

BACKGROUND OF THE INVENTION

1. Field of the Invention

This invention relates to a disc cartridge, and more particularly to a disc cartridge which is adapted to rotatably receive a hard disc, particularly, a magnetic disc therein.

2. Description of the Prior Art

Conventionally, a tray system or a cartridge system using a casing has been generally employed for protecting a compact disc or a video disc used for a digital-data storing unit, a video unit, a video camera or the like from damage and dust to ensure its safety in both non-use and use. For this purpose, the casing is provided with a slidable shutter made of metal which is operated to close a head inserting hole formed at the casing in non-use and open it in use.

Such a shutter is generally formed of a metal plate into a substantially U-shape and is slidably fitted on the casing so as to slide on upper and lower surfaces of the casing. For this purpose, upper and lower surfaces of a slide area section of the casing on which upper and lower shutter plates of the shutter fitted are formed in a manner to be flat and parallel to each other for ensuring smooth sliding operation of the shutter. In order to prevent a distal opening of the shutter, defined between distal ends of the shutter plates, from being enlarged during fitting of the shutter on the slide area section of the casing to cause the shutter to be disengaged or separated from the casing when dropping the cartridge or to cause the cartridge to be below the standards, it has been attempted to have the distal opening of the shutter formed into a reduced width in advance, to thereby forcibly render both surfaces of the shutter parallel to the upper and lower-surfaces of the casing the shutter is fitted on the casing.

Unfortunately, such an attempt fails to render both plates of the shutter, which have been fitted on the casing, parallel to the slide area of the casing, resulting in the distal ends of the shutter plates being pressedly contacted with both surfaces of the slide area section of the casing. Also, a variation of precision of the components of the disc cartridge such as the shutter, the casing and the like during the manufacturing or an inadequate combination therebetween often leads to an inconvenience such as a failure in smooth sliding of the shutter on the casing, pressing of the shutter against the casing, shaving or cutting of the casing by the shutter, drop-out of an information from a disc due to adhesion of the shavings to the disc, or the like.

Accordingly, it would be highly desirable to develop a disc cartridge which is capable of ensuring smooth sliding operation of a shutter on a casing while eliminating disadvantages such as shaving or cutting of the casing by the shutter, drop-out of information from a disc, release or separation of the shutter from the casing, and the like.

SUMMARY OF THE INVENTION

Generally speaking, in accordance with the present invention, a disc cartridge is provided. The disc cartridge includes a casing having a slide area section formed thereon and adapted to rotatably receive a disc therein. The slide area section is defined by an upper surface, a lower surface and a side surface of a part of the casing and formed with at least one pickup inserting hole. The disc cartridge also includes a shutter which is formed of upper and lower shutter plates interconnected through distal ends thereof into a substantially U-shape and has a distal opening defined at a distal end of the shutter between the upper shutter plate and the lower shutter plate. The shutter is slidably fitted on the slide area section of the casing to operate the pickup inserting hole. In the slide area section, the upper and lower surfaces of the slide area section are obliquely formed in such a manner that a distance between the upper surface and the lower surface is reduced toward the distal opening of the shutter fitted on the slide area section.

The upper and lower shutter plates of the shutter may be so arranged that a distance therebetween is reduced toward the distal opening. Also, the upper and lower shutter plates may be substantially flat.

The portion of the casing defining the upper and lower surfaces of the slide area section is gradually reduced in thickness toward the distal opening of the shutter fitted on the slide area section.

In the present invention constructed as described above, the shutter is slid on the slide area section of the casing of which the upper and lower surfaces are so oblique that a distance therebetween is reduced toward the distal opening of the shutter, thus, the whole upper and lower shutter plates of the shutter are substantially uniformly contacted with the oblique upper and lower surfaces of the slide area section, resulting in ensuring safe and smooth sliding movement of the shutter without causing shaving of the casing by the shutter and separation of the shutter from the casing.

Accordingly, it is an object of the present invention to provide a disc cartridge which is capable of being stably and smoothly with high reliability for a long period of time.

It is another object of the present invention to provide a disc cartridge which is capable of ensuring safe and smooth sliding operation of a shutter.

It is a further object of the present invention to provide a disc cartridge which is capable of effectively preventing shaving or cutting of a casing by a shutter.

It is still another object of the present invention to provide a disc cartridge which is capable of preventing drop-out of information from a disc.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is made to the following description taken in connection with the accompanying drawings in which like reference numerals designate like or corresponding parts throughout; wherein.

DETAILED DESCRIPTION OF THE PREFERRED EMBODIMENT

Now, a disc cartridge according to the present invention will be described hereinafter with reference to the accompany drawings.

Figure 1:
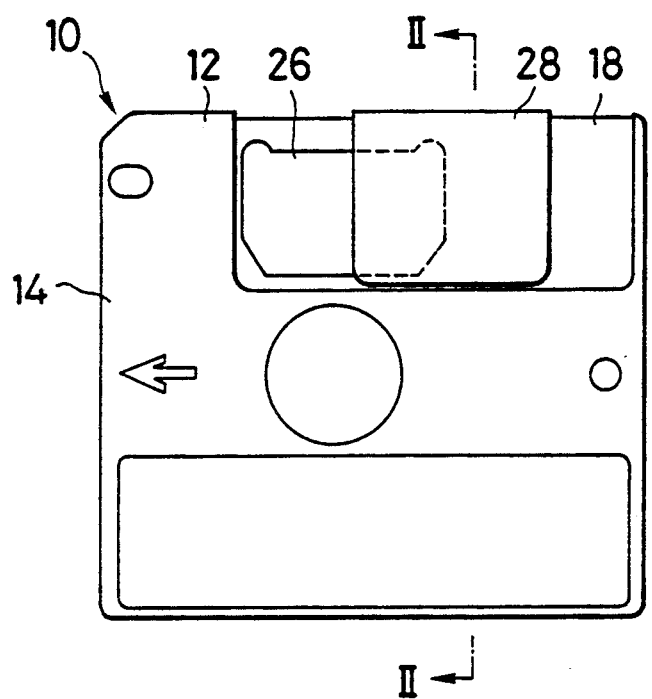
FIG. 1 is a plan view showing an embodiment of a disc cartridge according to the present invention.
Figure 2:
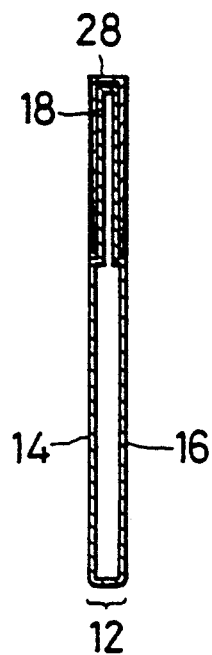
FIG. 2 is a vertical sectional view taken along line II—II of FIG. 1.
Figure 3:
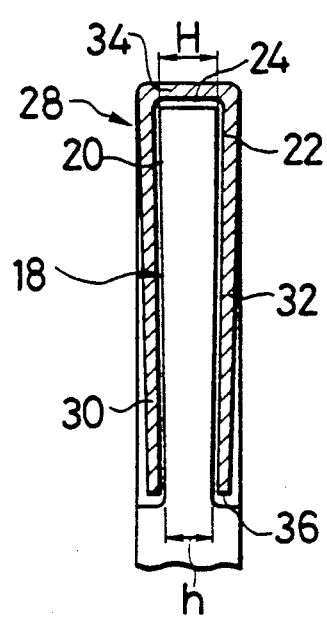
FIG. 3 is a fragmentary enlarged sectional view showing an essential part of the disc cartridge shown in FIG. 2.

FIGS. 1 to 3 illustrate an embodiment of a disc cartridge according to the present invention. A disc cartridge of the illustrated embodiment generally designated by reference numeral 10 includes a casing 12 for rotatably receiving a disc (not shown) therein. The casing 12 is formed by joining an upper casing member 14 and a lower casing member 16 together to define a disc receiving space therein. The casing 14 is provided thereon with a slide area section 18.

The slide area section 18, as shown in FIG. 3, is defined by an upper surface portion 20 which is a part of the upper casing member 14 of the casing 12, a lower surface portion 22 which is a part of the lower casing member 16, and a side surface portion 24 which is a part of a side wall of the casing 12 and through which the upper surface portion 20 and lower surface portion 22 are interconnected.

The slide area section 18 is formed with at least one pickup inserting hole 26, which may be formed into a substantially rectangular shape. The pickup inserting hole 26 may be provided on each of the upper and lower casing members 14 and 16 of the casing 12.

Figure 4:
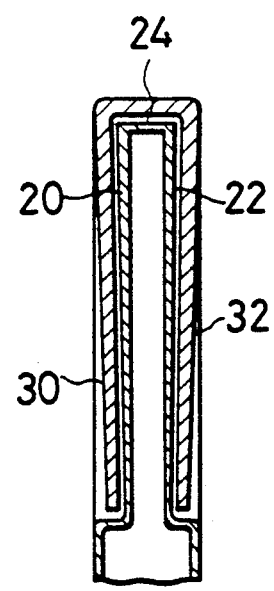
FIG. 4 is a fragmentary enlarged sectional view showing an essential part of a modification of the embodiment shown in FIG. 3.

The disc cartridge 10 also includes a shutter 28 formed into a substantially U-shape. More particularly, the shutter 22 includes a flat upper plate member 30 and a flat lower plate member 32 which are connected at proximal ends thereof to each other through a bent portion 34. The upper and lower shutter plates 30 and 32 of the shutter 28 are so arranged that a distance between the upper shutter plate 30 and the lower shutter plate 32 is gradually reduced toward an distal opening 36 defined at a distal end between the upper shutter plate 30 and the lower shutter plate 32 and plates 30 and 32 have a progressively reduced cross-sectional thickness as shown in FIGS. 3 and 4. The so-constructed shutter 28 may be integrally formed of a metal sheet such as SUS 304 stainless steel. The shutter 28 is slidably fitted on the slide area section 18 of the casing 12 so as to be slid on casing 12 within a range of the slide area section 18 to operate the pickup inserting hole 26. Fitting of the shutter 28 on the casing 12 is carried out by somewhat expanding the distal opening 36 and then fitting the shutter 28 through the expanded opening 36 on the slide area section 18.

The flat upper surface portion 20 and flat lower surface portion 22 of the slide area section 18 are obliquely formed in such a manner that a dimension of the slide area section 18 in a direction of a thickness of the casing 12 is a maximum (H) at the side surface portion 24 of the slide area section 18 opposite to the bent portion 34 of the shutter 28 fitted on the casing 12, is gradually reduced toward the distal opening 36 of the shutter 28, and is a minimum (h) at a portion thereof corresponding to the opening 36.

Such construction of the slide area section 18 permits the upper and lower shutter plates 30 and 32 of the shutter 28 to be substantially uniformly contacted with the whole upper and lower surface portions 20 and 22 of the slide area section 18 even when the shutter 28 is so formed that a distance between both shutter plates 30 and 32 is reduced toward the distal opening 36.

FIG. 4 shows a mofification of the embodiment shown in FIGS. 1 to 3. In a disc cartridge of FIG. 4, a slide area section 18 is formed in such a manner that not only a flat upper surface portion 20 and a flat lower surface portion 22 of the slide area section 18 are obliquely formed as in the embodiment described above but each portion of upper and lower casing members 14 and 16 of a casing 12 defining the upper and lower surface portions 20 and 22 is gradually reduced in thickness toward a distal opening 36 of a shutter 28 fitted on the slide area section 18.

As can be seen from the foregoing, in the disc cartridge of the present invention, the slide area section is so constructed that the upper surface and lower surface portions of the slide area section are obliquely formed in such a manner that a dimension of the slide area section between the upper surface and the lower surface is gradually reduced toward the distal opening of the shutter fitted on the slide area section.

Such construction of the slide area section permits the upper and lower shutter plates of the shutter to be substantially uniformly contacted with the whole upper and lower surfaces of the slide area section, to thereby ensure smooth operation of the shutter, prevent shaving or cutting of the casing by the shutter and prevent dropout of information from the disc due to adhesion of the shavings to the disc, resulting in the ability of ensuring operation of the disc cartridge with high reliability.

It will thus be seen that the object set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as matter of language, might be said to fall therebetween.

What is claimed is:

1. A disc cartridge comprising:
a casing having a slide area section formed thereon and adapted to receive a disc which is adapted to rotate therein;
said slide area section being defined by an upper surface, a lower surface, and a side surface of a part of said casing, and formed with at least one pickup inserting hole; and
a shutter formed of upper and lower shutter plates interconnected through distal ends therof into a substantially U-shape structure and having a distal opening defined at the free ends of said upper shutter plate and said lower shutter plate, a thickness of at least one of said upper and lower shutter plates uniformly decreasing in thickness in a direction towards said distal opening;
said shutter being slidably fitted on said slide area section of said casing to selectively expose said pickup inserting hole;
said upper and lower surfaces of said slide area section of said casing being obliquely formed in such a manner that a distance between said upper surface and said lower surface is reduced toward said distal opening of said shutter fitted on said slide area section.

2. A disc cartridge as defined in claim 1, wherein said upper and lower shutter plates of said shutter are so arranged that a distance therebetween is reduced toward said distal opening.

3. A disc cartridge as defined in claim 2, wherein said upper and lower shutter plates of said shutter are substantially flat.

4. A disc cartridge as defined in claim 1, wherein the portion of said casing defining said upper and lower surfaces of said slide area section is gradually reduced in thickness toward said distal opening of said shutter fitted on said slide area section.

5. A disc cartridge as defined in claim 1, wherein both said upper and lower shutter plates uniformly decrease in thickness progressively from their interconnected distal ends to said distal opening.

6. A disc cartridge as defined in claim 5, wherein interior surfaces of said upper and lower shutter plates are parallel to said upper and lower surfaces of said slide section area.

7. A disc cartridge comprising:
a casing having a slide area section formed thereon and adapted to receive a disc which is adapted to rotate therein, said slide area section being defined by an upper surface, a lower surface, and a side surface of a part of said casing, and formed with at least one pickup inserting hole; and
a unitary metal shutter bent to form upper and lower shutter plates interconnected through distal ends thereof into a substantially U-shape structure and having a distal opening defined at said upper shutter plate and said lower shutter plate, the respective thicknesses of said upper and lower shutter plates being uniformly reduced in thickness in a direction towards said distal opening relative to their distal, said shutter being slidably fitted on said slide area section of said casing to selectively expose said pickup inserting hole.

8. A disc cartridge as defined in claim 7, wherein said upper and lower surfaces of said slide area section of said casing are obliquely formed in such a manner that a distance between said upper surface and said lower surface is reduced toward said distal opening of said shutter fitted on said slide area section.

9. A disc cartridge as defined in claim 8, wherein interior surfaces of said upper and lower shutter plates are parallel to said upper and lower surfaces of said slide section area.

10. A disc cartridge comprising:
a casing having a slide area section formed thereon and adapted to receive a disc which is adapted to rotate therein;
said slide area section being defined by an upper surface, a lower surface, and a side surface of a part of said casing, and formed with at least one pickup inserting hole; and
a shutter formed of upper and lower shutter plates interconnected through distal ends thereof into a substantially U-shape structure and having a distal opening defined at the free ends of said upper shutter plate and said lower shutter plate, the respective thicknesses of said upper and lower shutter plates being progressively reduced in thickness from said distal ends to said distal opening;
said shutter being slidably fitted on said slide area section of said casing to selectively expose said pickup inserting hole;
said upper and lower surfaces of said slide area section of said casing being obliquely formed in such a manner that a distance between said upper surface and said lower surface is reduced toward said distal opening of said shutter fitted on said slide area section, while maintaining a parallel alignment of the respective adjacent surfaces of said slide area section and said upper and lower shutter plates.

* * * * *